Nov. 11, 1930.                    R. J. NORTON                    1,781,074
                                  BRAKE MEMBER
                                Filed Dec. 7, 1928
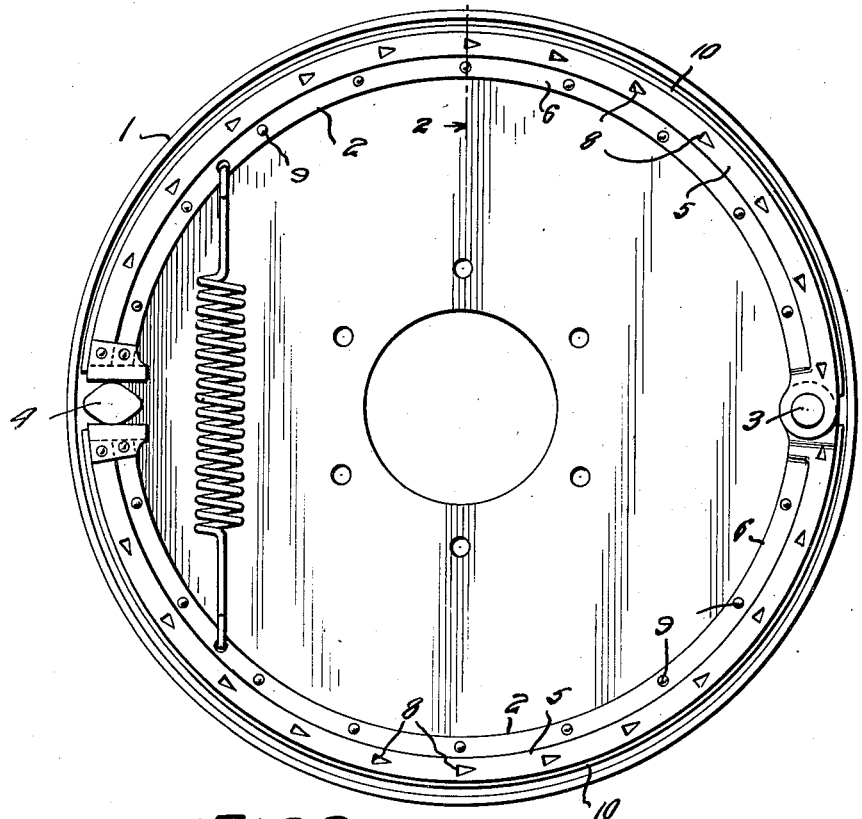
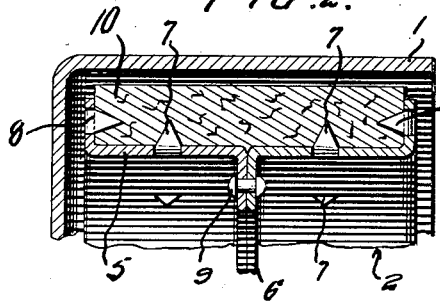
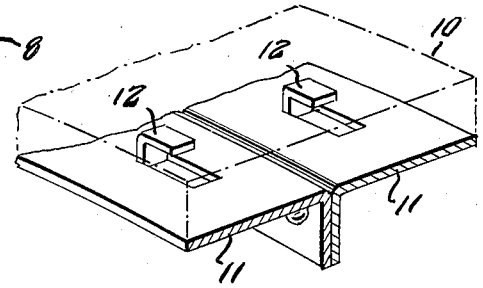
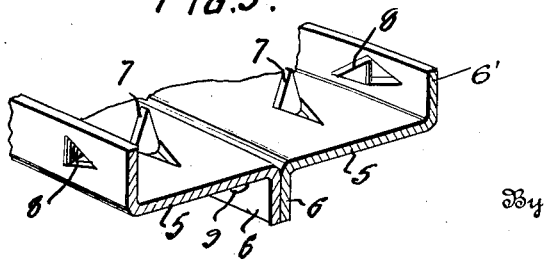
Inventor
RAYMOND J. NORTON
By M. W. McConkey
Attorney Patented Nov. 11, 1930

1,781,074

UNITED STATES PATENT OFFICE

RAYMOND J. NORTON, OF WASHINGTON, DISTRICT OF COLUMBIA, ASSIGNOR TO BENDIX BRAKE COMPANY, OF CHICAGO, ILLINOIS, A CORPORATION OF ILLINOIS

BRAKE MEMBER

Application filed December 7, 1928. Serial No. 324,362.

This invention relates to improvements in brake members and particularly of the type used on automotive vehicles.

The conventional brake apparatus comprises a drum fixed to a wheel and adapted to rotate therewith together with an associated non-rotatable braking member adapted to be forced into contact with either the interior or exterior periphery of the braking flange of the drum. Intermediate the non-rotatable and rotatable members is positioned a friction facing. In some cases this may be fixed to the drum but in the majority of assemblages it is attached to the internal shoe or exterior strap.

The present invention relates to a novel type of friction material for brake apparatus, clutches and the like.

Heretofore the friction material has comprised a woven or felted asbestos impregnated with a suitable binder. Such materials wear quite rapidly and as a result necessitate constant replacement. The present invention comprehends the provision of a friction material for the uses referred to which is eminently durable, of a high tensile strength and coefficient of friction and which is generally satisfactory for the described purposes.

In its essential features the invention comprises the attachment to the shoe of a synthetic resinous product.

In order to make the invention more easily understood, I have shown embodiments of it in the accompanying drawings. In these the same reference numerals apply to similar parts throughout the several views, of which, Figure 1 is a longitudinal section of a brake drum having associated internal expansion shoes provided with friction means according to the invention.

Figure 2 is an enlarged detail of the brake shoe having friction material attached thereto.

Figure 3 is an enlarged section of the shoe structure.

Figure 4 is an enlarged detail of a modified form of shoe.

There have been proposed heretofore friction linings comprising a phenol formaldehyde product. The material used in the present invention while of the same general nature as this material is specifically different and possesses differentiating properties and characteristics. The friction material herein proposed may be made up by reacting furfural or a derivative of furfural with a suitable phenol derivative in the presence of a suitable accelerator, as for example, hydrochloric acid. The physical characteristics of the resulting condensation product may be varied by adjustments of the thermal conditions of reaction and by the application of pressures. Depending upon the conditions under which the reaction is effected, the resulting composition may comprise a material which is relatively soft, like many natural resins or may be hard and infusible. The reaction between furfural derivatives and the phenolic component is characterized by a higher speed than that between phenol and formaldehyde. In addition to this the condensation products of furfural and phenol are readily separable from metal and may be removed from a mold or matrix while still hot without impairment of the finish or shape of the molded article. These factors, as will be seen more fully hereinafter, make such products particularly desirable for the present use.

It will be understood that for use according to the present invention the resin may be ground up and then mixed with or dispersed through a suitable fiber and thereafter fused so that it solidifies in the fibers and presents a reenforced composite structure. If desired the fibrous material may be impregnated with the condensation product while it is still in a plastic condition and may be allowed thereafter to solidify in and about the fibers.

The friction facing comprising the furfural condensation product may be formed up in separate molds or it may be mixed with short staple fiber such as asbestos and then placed in molds, from which it may be withdrawn for application to the brake shoe. If desired, however, the shoe may be used, so to speak, as a section of the mold and the plasticized product may be molded directly on an element with which it is to be used.

In one embodiment of the invention a fusible resin may first be made up and this, together with a sufficient quantity of a hardening agent, may be used to impregnate asbestos tape. After impregnation the impregnated tape may be heated, under pressure if desired, to form the infusible product. This treatment may also be employed for forming a shoe of felted asbestos and the resin or one composed only of the resin. The articles may be molded so as to present suitable indentations or apertures which permit the reception of securing means so as to provide for attachment to the shoe.

The actual processes of making up the fusible and infusible forms of the resin are well known to those skilled in the art. The fusible form of the condensation product may be prepared by reacting phenol or equivalent substances such as cresol, resorcinal, etc., with furfural or a furfural derivative and a condensing agent such as hydrochloric acid. The quantity of furfural or other hardening agent is chosen as insufficient to cause the formation of an infusible product. In carrying out this reaction one hundred parts, more or less, of phenol may be reacted with say, from twenty to forty parts of furfural and approximately ten parts of acid. During the subsequent reaction water is liberated and considerable heat generated. As is well known it is desirable to cool the reaction vessel so as to maintain a temperature of 200° F. or thereabouts. After reaction the mass may be heated to expel the water and acid and distilled to remove the excess of the phenolic constituent. Traces of acid may be neutralized with an alkali.

This fusible product may then be dissolved in a suitable solvent such as alcohol, acetone, etc., and additional quantities of a hardening agent such as furfuramid, furfural and ammonia, hexamethylenetetramine, etc., may be added. This reactive composition is then used, as explained, to impregnate a woven or felted tape, or it may be agitated with loose fibers of asbestos or other suitable fibrous material with or without a friction improving material.

After this treatment the mass may be placed in a mold and transformed to the infusible form by the continued application of heat at temperatures ranging from 200 to 350° F. or by the application of heat and pressure. As noted the mold may comprise, in part, a member which constitutes a part of the braking mechanism, that is to say, the product may be molded directly on the shoe with which it is to be used.

If desired the fibrous material may be treated with a fusible furfural condensation product which has been reduced to a discrete or powdered form. This material is heated to drive off occluded gases and moisture and then remilled. This powder may be adhered on or mixed with the fibers during the weaving or felting process or at any other desirable stage in the process. Such fusible material while substantially unaffected by heat or pressure when applied separately is plasticized by the simultaneous application of heat and pressure. The treated mass therefore may be placed in a mold and heated at from 300 to 350° F. under suitable pressure to cause the solid material to fuse; upon cooling and removal the article comprises the fiber condensed with a hard infusible homogeneous resin.

When the friction material is preformed as described it may then be bored to provide apertures for the passage of rivets by which it is affixed to the brake shoe or drum in the usual manner.

However, when the friction material is to be molded directly on the shoe it is desirable to use a slightly different structure. To more clearly explain this, different modifications of shoes are shown in the accompanying drawing in their relationship to a brake drum. As shown such brake apparatus may comprise a drum 1 within which are mounted the shoes 2, pivoted on the anchor pin 3. The shoes may be spread apart into engagement with the drum by suitable expansion means such as the cam 4 and may be retracted to inoperative position by the usual return spring.

The shoes preferably comprise metal stampings having oppositely extending terminal flanges 6 and 6′. The flanges 5 and 6′ at regular intervals along their length are cut and pressed out to provide the angularly extending projections 7 and 8. As will be appreciated by suitably forming the die, these projections may be formed up during the stamping operation. These are shown as being of V shape, but it will be understood that any desired shape may be given.

In forming the shoe the flanges 6 of two stampings may be placed back to back and rigidly secured together, as by bolts, rivets, spot welding, etc., as designated at 9. As thus joined, the two stampings form a single unitary structure having a circumferential flange 5—5, a central rigidifying or strengthening web 6—6, and the two side flanges 6′. As indicated this member may constitute a part of a matrix or mold for the molding operation. For this purpose the apertures adjacent the projections 7 and 8 may be fitted with removable blocks. The impregnated tape, which before the molding operation is flexible, is then forced into position on the shoe so that the projections 7 and 8 extend into the friction material, as shown in Figure 2. The top section of the mold may be placed down on the edges of the flanges 6′. The mold may be placed in a suitably heated container or the top section of the mold itself may be provided with means for supplying heat and pressure.

After treatment, for a period of time sufficient to effect infusibility, the top section of the mold may be removed leaving the set friction material firmly held to the shoe by the engagement of the projections. It will be noted that when the finished shoe is assembled and used in the brake all of the projections 7 and 8 tend to prevent any circumferential relative movement between the friction material and the metal backing and the projections 8 prevent any relative radial movement between the two. These projections therefore serve to lock the friction material to the metal shoe and also to transmit the braking thrust from the friction material to the shoe uniformly throughout its length.

It will be appreciated that this described double function may be subserved by utilizing other specific structure, an example of which is shown in Figure 4. The shoe may comprise two L shaped members rigidly secured back to back to provide a wide braking flange and a central radial reenforcing web. The circumferential flange may be cut out to provide the L shaped projections 12, having, as shown, integral vertical and horizontal arms. As hereinbefore described the apertures resulting from the punching up of the members 12 may be blocked in and this shoe section used as a mold member for a mass of plastic condensation product and a dispersed fiber.

After the molding operation the set infusible friction material will completely surround the projections 12. These projections may alternately extend in opposite circumferential directions. The vertical sections of the members 12 will serve to lock the friction facing against circumferential movement with respect to the shoe while the horizontal extensions will preclude relative radial movement. If desired each end of the shoe may be formed with an upturned end to provide a positive abutment for the friction material and serve as a supplementary means to prevent circumferential movement of the friction facing.

If desired the friction member may comprise a fibrous base in which is incorporated condensation products of different physical characteristics, thus the fiber may be so treated as to provide a layer of fiber adjacent the metal of the shoe in which is embodied an infusible form of the resin while the upper section of the friction material, which is adjacent the braking surface on the drum, may be impregnated with a furfural condensation product which is of the fusible type, but of sufficient rigidity to serve the described purposes.

If desired a further modification of the above may be employed. The upper section of the friction material may be impregnated with a potentionally reactive infusible furfural condensation product of a heavy resinous character. This may then be applied to a shoe and the shoe mounted in its associated relationship to the drum. The brake drum may then be rotated against the frictional resistance of the brake shoe so as to wear in the shoe to the proper diameter to insure complete circumferential engagement. If desired this rotation may then be continued so as to generate sufficient heat to cause further reaction and increase infusibility of the product. The shoe may be dismounted from the drum and separately heated in appropriate apparatus to effect further reaction to cause infusibility.

It will be understood that in all of the modifications described, the facing may be made up of a laminated structure. This type of structure is particularly useful when it is desired to employ a friction facing having condensation products of different physical characteristics, thus several laminæ may be impregnated with an infusible condensation product and other layers, for example, the top layers may be impregnated with a furfural resin which is not completely infusible. As is known, by varying the temperature and pressure conditions of reaction, the resins may be varied from a relatively soft gum to a hard infusible mass.

While I have shown and described the preferred modifications of the invention, it is to be understood that these are given merely as examples to explain the underlying principles and since these may be incorporated in other specific structures, I do not wish to be limited to those disclosed except that such limitations are clearly imposed by the appended claims.

I claim:

1. A friction facing comprising zones of fibrous material some of which are impregnated with an infusible and others with a fusible synthetic resin.

2. A friction facing of the zoned phenolic condensation product type having the friction surface thereof impregnated with a relatively soft form of condensation product and the remainder with a relatively hard form of the resin.

3. A friction material comprising laminæ of fibrous material having the outer zones bonded with a fusible furfural condensation product and the inner zones bonded with an infusible furfural condensation product.

4. A friction material comprising a felted fibrous material impregnated with furfural condensation products of relatively different degrees of hardness.

5. A friction material comprising a fibrous substance the frictional surface of which is impregnated with an incompletely reacted condensation product.

6. A friction material comprising asbestos fiber having its frictional surface impregnated with an incompletely reacted condensation product.

7. A friction material comprising a relatively inflammable fiber having its frictional surface impregnated with an incompletely reacted synthetic resin and the area subjacent to said frictional surface impregnated with a completely reacted resin.

8. As an article of manufacture, a friction material having zones of relatively different degrees of hardness.

9. As an article of manufacture, a friction material comprising a resinous product having zones of relatively different degrees of hardness.

10. As an article of manufacture, a friction facing impregnated with resinous products of differential physical characteristics.

In testimony whereof I affix my signature.

RAYMOND J. NORTON.